Feb. 2, 1960
W. G. MITCHELL
2,923,306
PRESSURE REGULATOR VALVE MECHANISM FOR AIR TOOLS
Filed Jan. 7, 1957
2 Sheets-Sheet 1
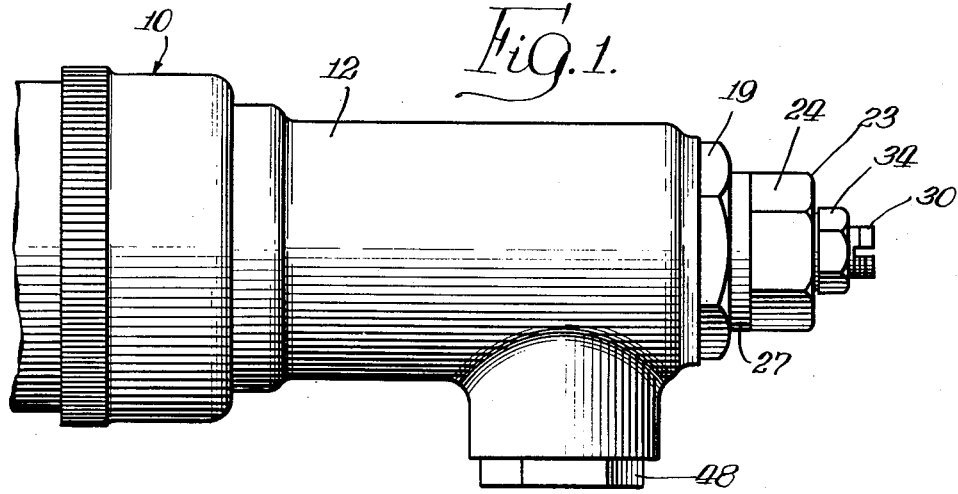
Fig. 1.
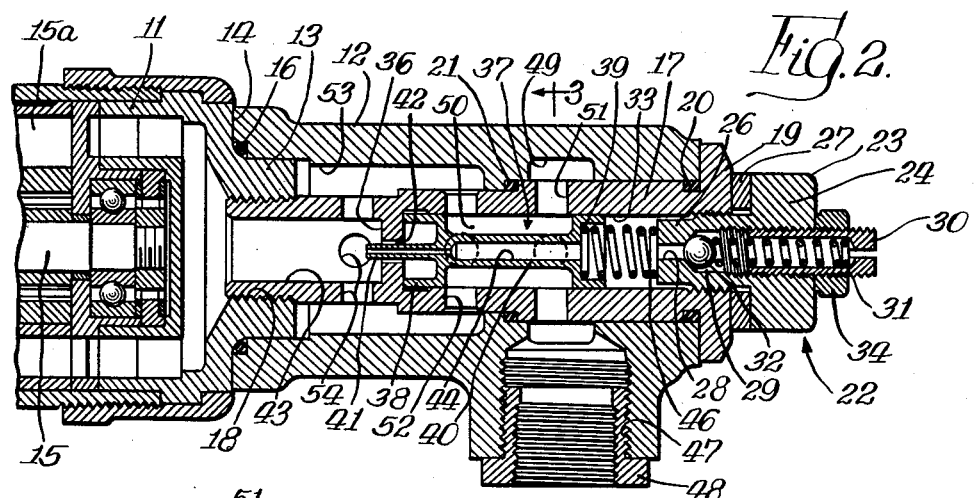
Fig. 2.
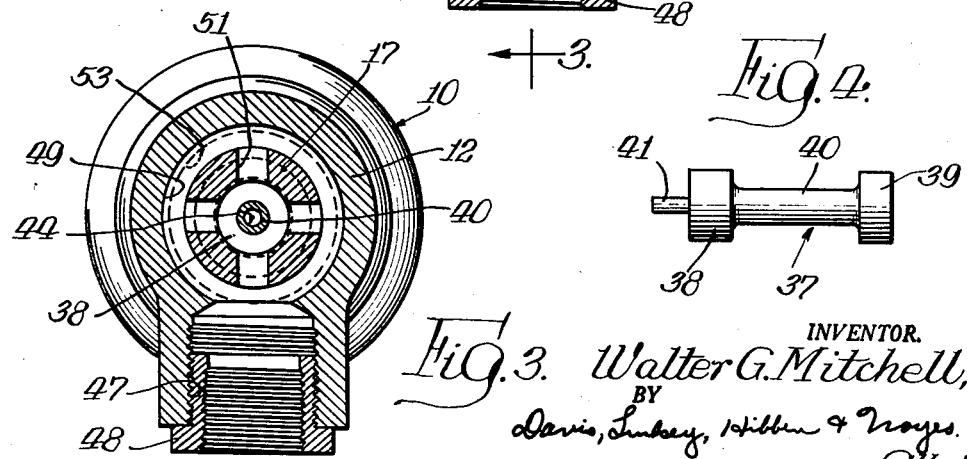
Fig. 3.
Fig. 4.
INVENTOR.
Walter G. Mitchell,
BY Davis, Lindsey, Hibben & Noyes.
Attys.

Feb. 2, 1960

W. G. MITCHELL 2,923,306

PRESSURE REGULATOR VALVE MECHANISM FOR AIR TOOLS

Filed Jan. 7, 1957

INVENTOR.
Walter G. Mitchell,
BY
Davis, Lindsey, Hibben & Noyes.
Atty's

United States Patent Office 2,923,306
Patented Feb. 2, 1960

2,923,306

PRESSURE REGULATOR VALVE MECHANISM FOR AIR TOOLS

Walter G. Mitchell, Aurora, Ill., assignor to Thor Power Tool Company, Aurora, Ill., a corporation of Delaware Application January 7, 1957, Serial No. 632,690

13 Claims. (Cl. 137—37)

This invention relates to pneumatic power tools and more particularly to a pressure regulator valve mechanism for rotary pneumatic power tools, such as nut setters, screw drivers and the like, whereby the speed and torque of an air motor may be controlled and regulated to permit variation in the degrees of tightness of the work, and for other pneumatic tools such as squeezers, hoists and the like wherein limitation and regulation of pressure is desired.

One of the principal objects of the present invention is to provide a pressure regulator valve mechanism for controlling the speed and torque of an air motor of a rotary pneumatic power tool.

Another object of the invention is to provide a pressure regulator valve mechanism for regulating the air pressure in a pneumatic tool.

Another object of the invention is to provide an adjustable pressure regulator valve mechanism by which the air motor torque may be varied to vary the degree of tightness to which a nut, bolt, screw or the like may be tightened.

A further object is to provide a pressure regulator valve mechanism for tools of the foregoing character whereby the initial air under pressure supplied to the air motor to start the same is at full line pressure unregulated and unaffected by the said pressure regulator valve mechanism, the latter not being effective until after the motor is started.

Still another object is to provide a pressure regulator valve mechanism of the foregoing character whereby rotary pneumatic power tools such as nut setters, screw drivers and the like may employ positive drives and positive clutch elements without requiring declutching of any type when the desired degree of work tightness is attained, the pressure regulator valve mechanism serving to vary the motor torque and hence the degree of tightness of a piece of work.

Other and further objects and advantages of the present invention will become apparent as this description progresses, reference being had to the accompanying drawing in which:

Fig. 1 is a broken away, side elevational view of the rearward or upper end portion of a rotary pneumatic tool in which the pressure regulator valve mechanism comprising a preferred embodiment of the present invention is housed;

Fig. 2 is a longitudinal sectional view of the structure shown in Fig. 1;

Fig. 3 is a transverse vertical sectional view taken on the line 3—3 in Fig. 2 looking in the direction of the arrows;

Fig. 4 is a side elevational view of the valve shown in section in Figs. 2 and 3;

Figure 5:
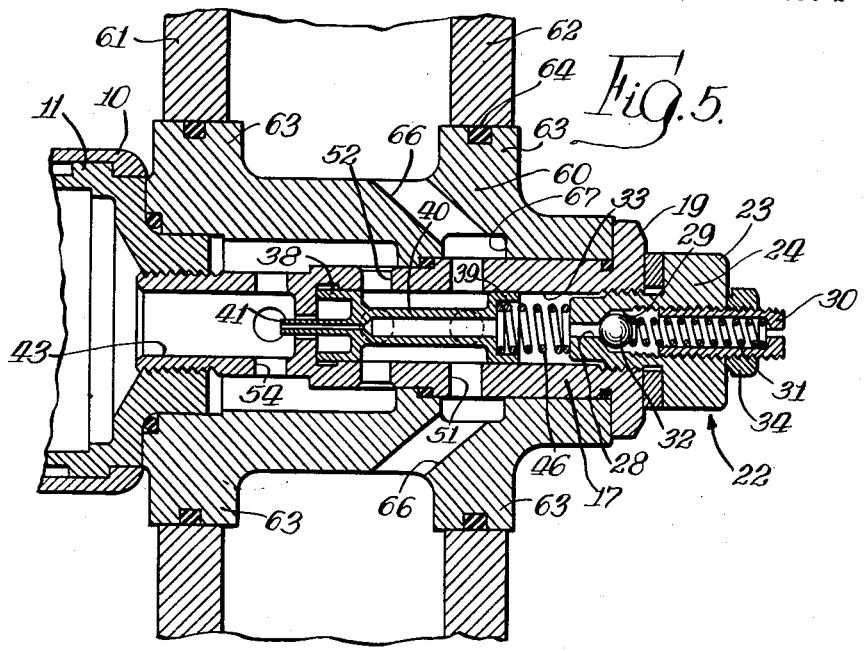
Figure 6:
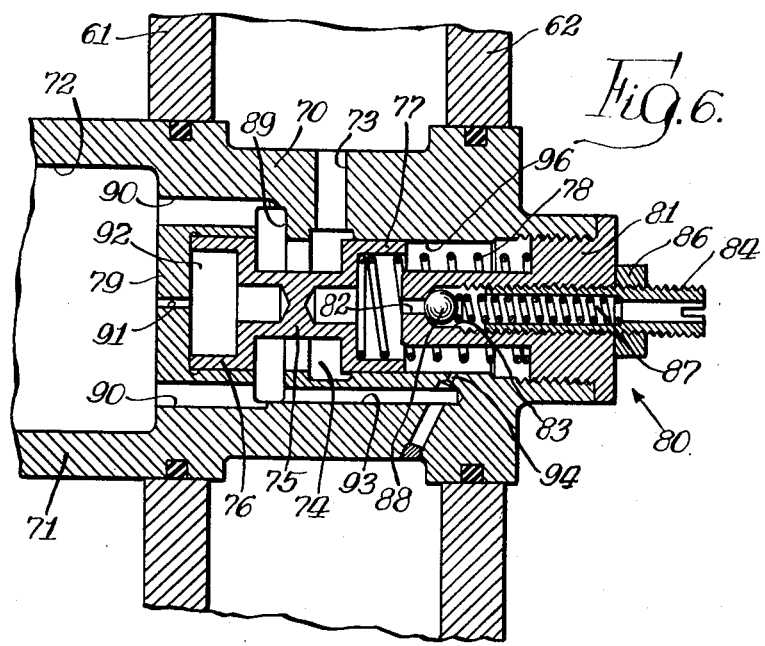

Fig. 5 is a longitudinal sectional view of the pressure regulator valve mechanism illustrated in Figs. 2 to 4, inclusive, but secured in position in a modified form of valve housing by which the tool and valve mechanism is adapted to be used in conjunction with a plurality of similar tools and valves in a unitary pressure head; and Fig. 6 is a longitudinal sectional view of a modified form of pressure regulator valve mechanism comprising the present invention and disposed in a multiple tool mounting somewhat similar to that of Fig. 5.

Referring more particularly to Figs. 1 to 4, inclusive, of the drawings, the pressure regulator valve and torque control mechanism is shown affixed to the rearward or upper end of a rotary pneumatic tool 10, such as a nut setter, screwdriver or the like having a motor housing 11 in which is mounted a rotary pneumatic motor 15 having the usual blades 15a. The motor is adapted to drive a work engaging member through a series of gears and through positive clutch teeth (not shown) which are incapable of declutching under torque. The valve mechanism is enclosed within an elongated valve housing 12 secured on the rearward end of the motor housing 11 which is provided with a rearward extension 13 of reduced diameter extending rearwardly within the forward end of the valve housing. The forward annular end face of the valve housing 12 abuts against the rearward shoulder 14 of the motor housing and this junction is sealed against the leakage of air pressure by a resilient sealing ring 16.

An elongated hollow valve body 17 is threadedly received at its reduced forward end within the threaded central opening 18 of the motor housing extension 13 and at its rearward end it is provided with an annular flange 19 which engages the rearward end of the valve housing 12. When the valve mechanism is assembled on the tool, the valve body 17 is screwed down into the motor housing extension 13 so as to tightly clamp the valve housing 12 between the motor housing shoulder 14 and the valve body flange 19. Annular sealing rings 20 and 21 are also disposed between the valve housing 12 and the valve body 17 at their central and rearward portions, respectively, and also serve to prevent the leakage of air pressure. The forward end of the valve body 17 opens directly into the upper end of the motor housing 11.

An adjustable pressure relief mechanism indicated generally by the numeral 22 is secured and supported on the rearward end of the valve body 17. The pressure relief mechanism comprises a ball check body 23 having a hexagonal head 24 at its rearward end and a forwardly projecting shank portion 26 at its forward end which is received within the rear end of the valve body 12 and threadedly secured thereto. An annular sealing washer 27 is clamped between the body head 24 and the valve body flange 19 and also serves to prevent the leaking of air pressure from the rearward end of the valve body 17. The ball check body 23 has an axially extending air passage 28 of reduced diameter at its forward end which connects with an air passage 29 of larger diameter extending rearwardly therethrough. A hollow adjusting screw 30 which is open at both ends is threadedly engaged within the threaded portion of the air passage 29 and houses a compression spring 31 which bears against and urges a valve ball 32 against the forward end of the air passage 29 which forms a seat therefor.

When the ball 32 is in seated position, the air passage 28 is closed and the passage of air from the valve chamber 33 is prevented. When the air pressure within the chamber 33 builds up to such an extent to force the ball 32 rearwardly from its seat, air will flow rearwardly from the chamber 33 and out through the adjusting screw 30 to atmosphere. Since the spring 31 is compressed between the ball 32 and the rearward end of the screw 30, the degree of compression of the spring, and thereby the amount of air pressure required to unseat the ball 32, may be adjusted or varied by screwing the adjusting screw in or out relative to the check ball body 23. A lock nut 34 is threadedly engaged on the projecting threaded end of the adjusting screw 30 to maintain the screw 30 in any desired position to which it may be adjusted.

Between the forward end of the ball check body 23 and a cross wall 36 within the valve body 17 there is mounted for reciprocal movement a hollow valve designated generally by the numeral 37 and having cup shaped head members 38 and 39 on its forward and rearward ends, respectively, which are connected by an elongated central portion 40 of reduced diameter. The valve 37 also has a tail portion 41 extending forwardly from the forward valve head 38 and having an axial bore of restricted diameter extending therethrough and forming a tube. The tube 41 extends forwardly through and beyond a central aperture 42 in the cross wall 36, the diameter of the aperture 42 being slightly larger than the outer diameter of the tube to form a restricted air passage so that air under pressure may pass rearwardly from the forward air chamber 43 of the valve body 17 between the walls of the aperture 40 and the outer surface of the tube into the annular air chamber within the valve head 38 to exert a rearward pressure thereagainst. The combination of the cup shaped recess in head member 38 and the fit of tube 41 into the aperture 42 also acts in the nature of a dashpot to stabilize the action of valve 37, thus prolonging the service life of the parts and producing smoother more effective regulation of pressure and torque.

The tube 41 connects with an axial air passage 44 extending through the valve between the head members 38 and 39, and as a result of this construction air under pressure may also pass from the forward chamber 43 of the valve body 17 through the tube 41, through the axial passage 44 and into the rearward air chamber 33 of the valve body. The air passage of the tube 41 is of restricted diameter to effect a delayed action in the passage of air therethrough as will be explained more fully hereinafter. A spring 46 is compressed within the air chamber 33 between the forward end of the ball check body 23 and the valve head 39 and urges the valve 37 forwardly to its seated or normal position shown in Fig. 2 with the forward head member 38 in engagement with the cross wall 36.

The valve housing 12 is provided with a threaded opening 47 in which is threadedly secured a connector member 48 adapted to receive the threaded coupling of an air hose (not shown) connected to a source of air under pressure. The housing opening 47 opens into an annular channel 49 formed in the inner wall of valve housing 12 and this channel is connected to the annular chamber 50 between the valve heads 38 and 39 by four radially directed air passages 51 extending radially through the valve body 17 as shown more clearly in Fig. 3. Forwardly of the air passages 51 and spaced rearwardly of the cross wall 36 are another series of four air passages 52 which also extend radially and connect the central valve chamber 50 with a large annular air chamber 53 formed between the valve body 17 and the valve housing 12. A third series of four air passages 54 extend radially through the valve body on the forward side of the cross wall 36 and connect the large annular chamber 53 with the forward air chamber 43 of the valve body 17.

The above-described pressure regulator valve mechanism has an extensive breadth of usefulness. Not only may it serve as a torque control means and permit a piece of work such as a nut, bolt or a screw to be set to the desired degree of tightness, but it also may be utilized as a pressure regulating device for pneumatic squeezers, hoists and other devices wherein limitation and regulation of pressure is desired. When it is desired to utilize the regulator mechanism in the nutsetter to tighten a piece of work to a relatively high degree of tightness, the adjusting screw 30 is screwed inwardly into the ball check body 23 so as to compress the spring 31 to a greater degree and thus place a greater load against the ball 29. This greater load requires greater build up of air pressure in the chamber 33 to move the ball from its seat so that greater air pressure will be available to produce a greater motor torque. If the piece of work is to be tightened to a lesser degree, the adjusting screw 30 will be screwed outwardly and the air pressure will be relieved at a lower point to produce a lower motor torque.

In the operation of tightening a nut, bolt or a screw, the tool 10 is placed in engagement with the piece of work and air under pressure will be admitted into the valve mechanism through the connector 48 by means of a hand valve (not shown). Air under pressure passes into the annular channel 49 of the valve housing 12 and then through the four radial passages 51 into the annular air chamber 50 between the valve heads 38 and 39. Air then passes radially outwardly through the radial passages 52 into the elongated annular air chamber 53 and then radially inwardly through the radial passages 54 into the forward air chamber 43 of the valve body 17 from which it then passes forwardly into the motor housing 11 to cause operation of the air motor.

It is to be noted that when the operating air is first introduced into the air pressure regulating mechanism the valve 37 is in its normal, non-regulating position shown in Fig. 2 and, consequently, the various air passages and channels from the source of air under pressure to the air motor 15 are free and unobstructed. This permits the initial quantity of air under pressure to pass into the air motor 15 at a high velocity and in great volume without regulation and this initial air overcomes the inertia of the air motor and starts the motor in operation. The regulating effect of the pressure regulating mechanism does not occur until after the air motor is set in operation. This is in contrast to other types of pressure regulator mechanisms disposed in air lines which regulate and reduce air pressures initially before air can reach the air motors to start the same.

A reduced amount of the air under pressure passes rearwardly through the restricted valve tube 41 and through the valve passage 44 into the rearward air chamber 33. Since the ball 29 is held at this time against its seat by the spring 31 blocking the air under lower initial pressure, air cannot pass through the pressure relief means 22 and consequently a pressure is exerted against the rearward face of the valve head 39 which together with the spring 46 urges the valve 37 forwardly.

Simultaneously air under pressure passes rearwardly from the forward air chamber 43 through the restricted opening 42 of the cross wall 36 into the space on the forward side of the valve head 38 and hence urges the valve 37 in a rearward direction. The areas of the forward and rearward faces of the valve heads 38 and 39 of the valve 37 are equal and hence the forward and rearward pressures of the air in the forward and rearward air chambers are equal and balanced. Consequently, the valve 37 remains in its normal forward position under the urge of spring 46 until the work piece approaches its set or tightened position.

Where reduced speed, momentum and intermediate tightness of the work is desired, this may be achieved by a lower spring pressure on ball 32 resulting in a pressure balance on valve 37 so that it is positioned in a partially closed relationship with ports or radial passages 52, as will presently be described. In this relationship the level of total torque or tightness is dependent upon the total value of the two main components comprising the inertia or flywheel effect of the rotating parts and the fluid pressure acting to drive the motor blades.

When the nut, bolt or screw becomes tighter, its resistance to the rotation by the motor torque gradually increases with the result that the air pressure within the air motor gradually increases and consequently the air pressures within the chambers 43 and 33 of the valve body and forwardly of forward valve head 38 likewise increase. Finally when the piece of work reaches its tightened position determined by adjustment of the pressure relief mechanism 22, the air pressure within the rearward air chamber 33 attains its adjusted maximum and as a result, the tension of spring 31 is overcome and the ball 32 is forced rearwardly from its seat, thus permitting the air pressure in chamber 33 to be vented to atmosphere through the air passages 28 and 29 and through the rearward aperture in the adjusting screw 30.

Due to the restricted size of tube 41 as compared to the size of the air outlet passages 28 and 29 through the pressure relief mechanism 22, the air pressure in chamber 33 drops rapidly until it equalizes itself with the pressure of spring 31 against the ball as the valve moves to main line shut off position. Also due to the restricted size of the tube 41, the air pressure in the forward chamber 43 and in the chamber 33 and in the chamber forwardly of the valve 38 remains at a relatively high level and consequently when the pressure in chamber 33 is reduced, the valve 37 becomes unbalanced and moves rearwardly so that the valve head 38 partially closes the four radial air passages 52, thus reducing the flow of air under pressure to the motor. As a result, the air pressure in the chamber 43 drops and the pressure available to the motor is insufficient to overcome the resistance of the work to further rotation and consequently the motor will stall indicating to the operator that the work has been tightened to the desired point. The valve 37 continues to move rearwardly as the air pressure continues to build up until the air pressure in the valve chamber 43 closes the valve completely admitting no more air and completing the cycle of tool operation. When the main line air supply is cut off by the operator or by automatic valve means, as above described, the air in chamber 43 leaks out to atmosphere and the valve 37 and ball 29 return to their original positions for the beginning of another control cycle.

The pressure regulator valve mechanism shown in the modification of Fig. 5 is the same as that illustrated in Figs. 1 to 4, inclusive, of the drawings except that it is contained within an annular housing 60 secured in a multiple tool head for supporting a plurality of tools working as a gang to tighten a plurality of nuts or bolts simultaneously. Consequently like numerals represent like parts in Figs. 1 to 5, inclusive. The tool head comprises a plurality of spaced parallel plates 61 and 62 which are joined together in a sealed unit (not shown) and between which air under pressure is fed to provide a source of air pressure for the air motors of the rotary tools. The housing 60 is provided with flanges 63 which engage the plates 61 and 62, annular sealing rings 64 mounted therebetween serving to prevent the leakage of air from the head.

The housing 60 has a plurality of diagonally cut air passages 66 leading from the air chamber of the head to an annular groove 67 in the housing which is in registry with the air passage 51 of the valve body 17. The operation of the pressure regulator valve is the same as described above in Figs. 1 to 4, inclusive. By giving the adjusting screw 30 of the pressure relief mechanism of each tool in the gang the same setting, the air motors of each tool will stall at substantially the same degree of torque and each piece of work will be tightened to substantially the same degree of tightness.

A further modification of the pressure regulator valve mechanism comprising the present invention is shown in Fig. 6 mounted in a multiple tool supporting head similar to that shown in Fig. 5 and having head plates 61 and 62 and an air supply chamber therebetween. The valve housing 70 is shown as integrally connected to the air motor housing 71, the upper air chamber of the latter being designated by the numeral 72. The valve housing 70 also serves as the valve body and is provided with an air inlet passage 73 connecting the air chamber of the head with a central valve chamber 74. A valve having cup shaped heads 76 and 77 on its forward and rearward ends, respectively, and connected by a central portion 75 of reduced diameter is mounted within the valve housing 70 for rearward and forward sliding movement. A spring 79 urges the valve forwardly or to the left with the forward valve head 76 in seated engagement with a cross wall 79 of the housing.

An adjustable pressure relief mechanism 80 similar in general structure and mode of operation to the pressure relief mechanism 22 of Figs. 1 to 4, inclusive, and of Fig. 5, is threadedly secured in the rearward end of the valve housing 70. This mechanism comprises a ball check body 81 having air passages 82 and 83 extending therethrough and a hollow adjusting screw 84 threadedly secured therein and locked in position by a lock nut 86. A compression spring 87 is confined within the adjusting screw 84 and urges a ball valve 88 against its seat at the forward end of the air passage 83 so as to block the passage of air through the pressure relief mechanism 80 when the pressure is below a predetermined minimum. The spring 78 is seated against the ball check body 81 and bears against the inner face of the valve head 77 so as to urge the same in a forward direction.

Air under pressure enters the pressure regulator valve mechanism from the air supply chamber between the head plates 61 and 62 through the air passage 73 and passes into the central valve chamber 74 between the valve heads 76 and 77. It then passes to the upper or rearward air chamber 72 of the air motor through a plurality of radial air passages 89 connecting with a plurality of longitudinal air passages 90. The cross wall 79 has an air passage 91 of restricted diameter extending therethrough into the air chamber 92 on the forward side of the valve head 76. This air passage 91 is of smaller size than the air inlet passages 89 and 90 and permits air pressure to be built up in the chamber 92 and to exert a pressure against the valve head 76 in a rearward direction.

The valve housing 70 is also provided with a rearwardly extending air passage 93 which extends from one of the radial air passages 89 to a diagonal air passage 94 of restricted diameter entering into the rear air chamber 96. Air under pressure is thus permitted to enter the air chamber 96 and to exert a force against the rear faces of the valve head 77 to urge it in a forward direction. The pressures on each valve head are equal and hence the valve at this instant is balanced.

The mode of operation of the pressure regulator valve mechanism described above and shown in Fig. 6 of the drawings is substantially the same as that of the embodiments shown in Figs. 1 to 5, inclusive. When the operator supplies air under pressure to the multiple tool head, the slidable valve is in its forward or left position shown in Fig. 6 with the radial air passages 73 and 89 fully open and unobstructed by the valve heads 76 and 77. Air thus flows readily and quickly to the air motor chamber 72 and the air motor is immediately set in operation. Air under pressure likewise enters the air chamber 92 forwardly of the valve head 76 and simultaneously enters the air chamber 96 rearwardly of the valve head 77. Since these pressures in the chambers 92 and 96 are equal the slidable valve remains in the position shown in Fig. 6 and a full volume of air under pressure is delivered to the motor to operate the same.

When the nut, bolt or the like reaches the desired degree of tightness as determined by the setting of the adjusting screw 84, rotation of the air motor will be retarded and air pressure will build up in the chambers 92 and 96 with the result that the ball valve 88 is unseated rearwardly and air is rapidly exhausted from the chamber 96 to atmosphere. Since the air passages 82 and 83 through the adjusting screw 84 are larger than the restricted air inlet passage 94 to the chamber 96 the incoming air will be insufficient to restore the air pressure in the chamber and consequently the slidable valve will be forced rearwardly by the pressure in chamber 92. The valve continues to move rearwardly until the air pressure in chambers 92 and 96 becomes equal. As the valve head 76 is moved rearwardly, it passes partially across the radial air passages 89 and thereby obstructs the free flow of air under pressure to the air motor chamber 72, thus reducing the air pressure on the motor and causing the motor to stall. As the motor stalls, the air pressure continues to build up forcing the valve to its full rearward position thus closing the air port 89 and completing the cycle of tool operation. This is noted by the operator who may then remove the tool from the work.

It is to be noted that the present pressure regulator valve mechanism has additional advantages over pressure regulators that may be placed in the supply line. In use of the present embodiment of the invention, when the hand valve (not shown) is operated to start the air motor, pressurized air passes with great velocity and full force into the air motor chamber 72 so as to start the air motor from a standstill. This force of inertia of the motor is readily and instantly overcome and the motor is started before the pressure regulating valve mechanism can become operative. Instantly thereafter the pressure builds up in the air chambers to the desired degree, the ball valve of the pressure relief mechanisms being unseated at a pressure determined by the spring setting so as to reduce the air pressure in the air motor chamber and thus control the speed and torque of the motor.

The pressure regulator valve mechanism being mounted at the rear of the air motor and being a separate unit is readily accessible for inspection, cleaning and adjustment and the pressure relief screw is also readily accessible to an operator, particularly where nutsetters are mounted as a gang in a unitary supporting head. The mechanism comprises a relatively few number of parts which are of simple, inexpensive construction and capable of ready assembly in manufacture.

Although several embodiments of the pressure regulator valve mechanism and rotary pneumatic tool comprising the present invention have been described in detail above and shown in the accompanying drawings, it is to be understood that changes and modifications may be made in the details of structure and mode of operation without departing from the spirit and scope of the appended claims.

I claim:
1. In a rotary pneumatic power tool having a rotary air motor, a pressure regulator mechanism for controlling the output torque of said motor comprising valve means, air passage means for connecting said valve means with a source of air under pressure and for connecting said valve means with said air motor and adapted to be unobstructed by said valve means in its normal position and to be obstructed by said valve means upon movement thereof from normal position, means for maintaining said valve means in normal position, air chambers on opposite sides of said valve connected with said source of air under pressure and serving to contain air exerting pressures against said opposite sides of said valve, and a pressure relief mechanism connected with one of said air chambers and adapted to relieve the pressure therein to effect movement of said valve means from normal position to obstruct the said passage means and to control the flow of said air to said motor.

2. In a rotary pneumatic power tool having a rotary air motor, a pressure regulator mechanism for controlling the output torque of said motor comprising valve means, air passage means for connecting said valve means with a source of air under pressure and for connecting said valve means with said air motor and adapted to be unobstructed by said valve means in its normal position and to be obstructed by said valve means upon movement thereof from normal position, means for maintaining said valve means in normal position, air chambers on opposite sides of said valve connected with said source of air under pressure and serving to contain air exerting pressures against said opposite sides of said valve, pressure relief mechanism connected with one of said air chambers and adapted to relieve the pressure therein to effect movement of said valve means from normal position to obstruct the said passage means and to control the flow of said air to said motor, and means for adjusting said pressure relief mechanism for varying the pressure at which the pressure in said one air chamber is relieved.

3. In a rotary pneumatic power tool having a rotary air motor, a pressure regulator mechanism for controlling the output torque of said motor comprising valve means, air passage means for connecting said valve means with a source of air under pressure, air passage means for connecting said valve means with said air motor and adapted to be unobstructed by said valve means in its normal position and to be obstructed by said valve means upon movement thereof from normal position, means for maintaining said valve means in normal position, air chambers on opposite sides of said valve connected with said source of air under pressure and serving to contain air exerting pressures against said opposite sides of said valve, and a pressure relief mechanism connected with one of said air chambers and adapted to relieve the pressure therein to effect movement of said valve means from normal position to obstruct the said passage means and to control the flow of said air to said motor.

4. In a rotary pneumatic power tool having a rotary air motor, a pressure regulator mechanism for controlling the output torque of said motor comprising valve means, air passage means for connecting said valve means with a source of air under pressure and for connecting said valve means with said air motor and adapted to be unobstructed by said valve means in its normal position and to be obstructed by said valve means upon movement thereof from normal position, means for maintaining said valve means in normal position, air chambers on opposite sides of said valve connected with said source of air under pressure and serving to contain air exerting pressures against said opposite sides of said valve, restricted air passage means of lesser size than said first named passage means for conducting said air under pressure to said air chambers from said first named passage means, and a pressure relief mechanism connected with one of said air chambers and adapted to relieve the pressure therein to effect movement of said valve means from normal position to obstruct the said first named passage means and to control the flow of said air to said motor.

5. In a rotary pneumatic power tool having a rotary air motor, a pressure regulator mechanism for controlling the output torque of said motor comprising valve means, air passage means for connecting said valve means with a source of air under pressure and for connecting said valve means with said air motor and adapted to be unobstructed by said valve means in its normal position and to be obstructed by said valve means upon movement thereof from normal position, means for maintaining said valve means in normal position, air chambers on opposite sides of said valve connected with said source of air under pressure and serving to contain air exerting pressure against said opposite sides of said valve, restricted air passage means of lesser size than said first named passage means for conducting said fluid under pressure to said air chambers from said first named passage means, and a pressure relief mechanism connected with one of said air chambers and adapted to relieve the pressure therein to effect movement of said valve means from normal position to obstruct the said first named passage means and to control the flow of said air to said motor, said pressure relief mechanism having an air outlet passage of larger size than said restricted passage means.

6. In a rotary pneumatic power tool having a rotary air motor, a pressure regulator mechanism for controlling the output torque of said motor comprising valve means, air passage means for connecting said valve means with a source of air under pressure, air passage means for connecting said valve means with said air motor and adapted to be unobstructed by said valve means in its normal position and to be obstructed by said valve means upon movement thereof from normal position, means for maintaining said valve means in normal position, air pressure chambers on opposite sides of said valve means connected with said source of air under pressure and serving to contain air exerting pressures against said opposite sides of said valve, restricted air passage means of lesser size than said second air passage means for conducting air under pressure to said air chambers, and pressure relief mechanism connected with one of said air chambers and adapted to relieve the pressure in said one chamber to effect movement of said valve means from normal position to obstruct the free flow of air under pressure to said air motor.

7. In a rotary pneumatic power tool having a rotary air motor, a pressure regulator mechanism for controlling the output torque of said motor comprising an air pressure chamber connected to said air motor, valve means, air passage means for connecting said valve means with a source of air under pressure, air passage means for connecting said valve means with said air pressure chamber and adapted to be unobstructed by said valve means in its normal position and to be obstructed by said valve means upon movement thereof from normal positions, means for maintaining said valve means in normal position, air pressure chambers on opposite sides of said valve means connected with said first named air chamber and serving to contain air exerting pressures against said opposite sides of said valve, restricted air passage means of lesser size than said second air passage means for conducting air under pressure from said first named air chamber to said latter named air pressure chambers, and pressure relief mechanism connected with one of said latter named air chambers and adapted to relieve the pressure in said one chamber to effect movement of said valve means from normal position to obstruct the free flow of air under pressure to said air motor.

8. In a rotary pneumatic power tool having a rotary air motor, a pressure regulator mechanism for controlling the output torque of said motor comprising an air pressure chamber connected to said air motor, valve means, air passage means for connecting said valve means with a source of air under pressure, air passage means for connecting said valve means with said air pressure chamber and adapted to be unobstructed by said valve means in its normal position and to be obstructed by said valve means upon movement thereof from normal positions, means for maintaining said valve means in normal position, air pressure chambers on opposite sides of said valve means connected with said first named air chamber and serving to contain air exerting pressures against said opposite sides of said valve, a plurality of restricted air passage means of lesser size than said second air passage means for conducting air under pressure from said first named chamber to said latter named air pressure chambers, one of said restricted passage means extending through said valve means to one of said latter named chambers, and pressure relief mechanism connected with said one latter named chamber and adapted to relieve the pressure in said one chamber to effect movement of said valve means from normal position to obstruct the free flow of air under pressure to said air motor.

9. In a rotary pneumatic power tool having a rotary air motor, a pressure regulator mechanism for controlling the output torque of said motor comprising a valve housing, a valve body secured in said housing and having an air chamber at one end thereof adapted to be directly connected with said air motor, a slidable valve means mounted for slidable movement in said valve body, air passage means in said body for connecting said valve means with a source of air under pressure, air passage means in said valve body for connecting said valve means with said air chamber and adapted to be unobstructed by said valve means in its normal position and to be obstructed by said valve means upon movement thereof from normal position, means for maintaining said valve means in normal position, air pressure chambers on opposite sides of said valve means connected with said valve body air chamber and serving to contain air exerting pressures against said opposite sides of said valve, restricted air passage means of lesser size than said second air passage means for inducting air under pressure from said valve body air chamber to said latter named air pressure chambers, and pressure relief mechanism connected with one of said air pressure chambers and adapted to relieve the pressure in said one air pressure chamber to effect movement of said valve means from normal position to obstruct the free flow of air under pressure to said air motor.

10. A rotary pneumatic power tool comprising a rotary air motor and a pressure regulator mechanism for controlling the output torque of said motor having valve means, air passage means connecting said valve means to said air motor, air passage means connecting said valve means to a source of air under pressure, said valve means being adapted in normal position to be in unobstructing relation relative to said air passage means connected to said motor to permit the full flow of air through said latter air passage means and to obstruct the same upon movement from normal position, and pressure relief mechanism pneumatically connected with said valve means and adapted to effect movement of said valve means from normal position to obstruct the said passage means and to control the flow of air to said motor, said pressure relief means being normally disposed in closed pressure holding position and adapted to open to relieve pressure upon the build up of a predetermined pressure in said mechanism.

11. A pressure regulator mechanism for controlling the output torque of a rotary air motor for a rotary pneumatic tool comprising valve means, means for maintaining said valve means in non-regulating normal position, air passage means adapted to connect said valve means to an air motor, air passage means connecting said valve means to a source of fluid under pressure, said valve means being adapted in normal position to be in unobstructing relation relative to said motor air passage means to permit the full flow of air through said latter air passage means and to obstruct the same upon movement from normal position, and pressure relief means pneumatically connected with said valve means for effecting movement of said valve means from normal position upon the build up of air pressure in said mechanism to obstruct the said motor air passage means and to control the flow of air therethrough, said pressure relief means being normally disposed in closed pressure holding position and adapted to open to relieve pressure upon the build up of a predetermined pressure in said mechanism.

12. In a pneumatic power tool having a pneumatic motor, a pressure regulator mechanism for controlling the pressure of the air being admitted to the motor comprising valve means, air passage means for connecting said valve means with a source of air under pressure and for connecting said valve means with said air motor and adapted to be unobstructed by said valve means in its normal position and to be obstructed by said valve means upon movement thereof from normal position, means for maintaining said valve means in normal position, air chambers on opposite sides of said valve connected with said source of air under pressure and serving to contain air exerting pressures against said opposite side of said valve, and a pressure relief mechanism connected with one of said air chambers and adapted to relieve pressure therein to effect movement of said valve means from normal position to obstruct the said passage means and to control the flow of said air to said motor.

13. In a rotary pneumatic power tool having a rotary air motor, a pressure regulator mechanism for controlling the output torque of said motor comprising a valve housing, a valve body secured in said housing and having an air chamber at one end thereof adapted to be directly connected with said air motor, a slidable valve means mounted for slidable movement in said valve body, air passage means in said body for connecting said valve means with a source of air under pressure, air passage means in said valve body for connecting said valve means with said air chamber and adapted to be unobstructed by said valve means in its normal position and to be obstructed by said valve means upon movement thereof from normal position, means for maintaining said valve means in normal position, air pressure chambers on opposite sides of said valve means connected with said valve body air chamber and serving to contain air exerting pressures against said opposite sides of said valve, restricted air passage means of lesser size than said second air passage means for inducting air under pressure from said valve body air chamber to said latter named air pressure chambers comprising an air passage connecting said valve body air chamber with an air chamber on one side of said valve and a tube extending from said valve through said air passage in spaced relation from the sides thereof and connecting the said valve body air chamber with the other air chamber on the other side of said valve, and pressure relief mechanism connected with one of said air pressure chambers and adapted to relieve the pressure in said one air pressure chamber to effect movement of said valve means from normal position to obstruct the free flow of air under pressure to said air motor.

References Cited in the file of this patent
UNITED STATES PATENTS

| | | |
|---|---|---|
| 1,298,007 | Cheney | Mar. 25, 1919 |
| 1,406,216 | Olson | Feb. 14, 1922 |
| 2,551,916 | Van Sittert | May 8, 1951 |